Aug. 18, 1964

G. SUGA 3,145,257

ADJUSTABLE REAR VISION MIRROR

Filed Feb. 21, 1962

INVENTOR.
GORO SUGA

BY
Attorney

United States Patent Office 3,145,257
Patented Aug. 18, 1964

3,145,257
ADJUSTABLE REAR VISION MIRROR
Goro Suga, 45–129 Popoki St., Kaneohe, Hawaii
Filed Feb. 21, 1962, Ser. No. 174,773
3 Claims. (Cl. 88—87)

This invention relates to a mirror, and more particularly to an adjustable rear view mirror for automobiles or the like.

Heretofore, adjustable rear view mirrors have been mounted in autos or the like for oscillatory movement during the adjustment of the mirrors relative to the autos. Most such oscillatory mirrors are of the type that are provided with apparatus for oscillating an entire mirror as a unit about a single axis. Controls are usually provided so that the operator may stop the oscillation of the mirror in any of several positions of adjustment. Generally it is necessary for the operator to watch the mirror even as it is being oscillated, so that he may halt the movement of the mirror as soon as it reaches the position which affords him the desired view to the rear or side of his vehicle. This constant observation of the moving mirror may cause the driver to experience an unpleasant sensation; a sensation which may have an immediately harmful effect on his driving. Moreover, upon adjusting one of said oscillatory mirrors into a position which will afford the operator a greater lateral view toward either one side of the automobile or the other, the operator may find that his view of the traffic at the rear of his automobile has been dangerously impaired.

It is an object of this invention to provide an improved, adjustable rear view mirror which will at all times afford the operator of an automobile satisfactory and safe vision to the rear of the auto.

A further object of this invention is to provide an improved rear view mirror of the type having power operated adjusting means operative to alter the lateral view afforded by the mirror.

A more specific object of this invention is to provide an automobile rear view mirror of the type having portions movable relative to one another to alter the lateral view afforded by the mirror.

Other objects of the invention will be apparent hereinafter from the specification and from the recital of the appended claims, particularly when read in conjunction with the accompanying drawing.

Figure 1:
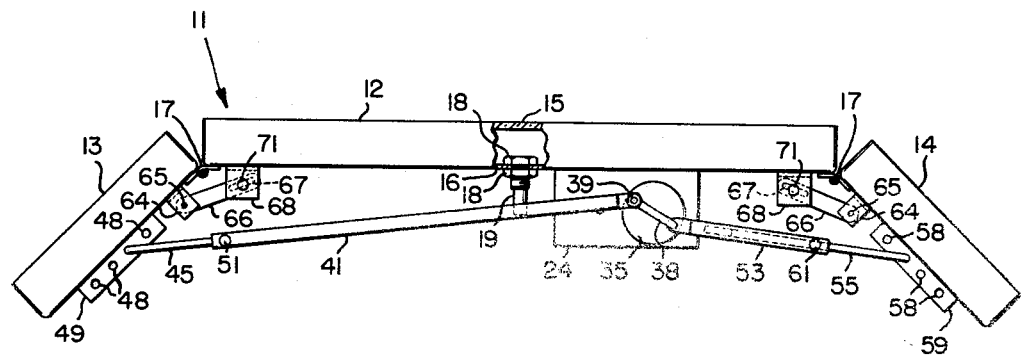
FIG. 1 is a plan view of one embodiment of the invention.

Referring now to the drawing by numerals of reference, 11 designates generally a mirror comprising an elongate, rectangular, center mirror panel 12 and two, smaller, rectangular side or end panels 13 and 14, respectively. Each mirror panel 12 to 14 comprises a glass mirror 15 which is secured around its marginal edge in the open end of a shallow, metallic housing 16. Each side panel 13 and 14 is secured by a plurality of hinges 17 to opposite ends, respectively, of the mirror panel 12. Hinges 17 may be secured to the respective housings 16 of panels 12 to 14 by spot welding, by bolts or by other conventional means.

Secured by nuts 18 to the back of the center panel 12 and projecting outwardly from the rear of the panel is a mounting shaft 19. Shaft 19 is adapted to be connected by means of a universal joint or the like (not illustrated) to a stationary mirror hanger or bracket or conventional type such as is customarily secured in an automobile adjacent the upper edge of the windshield, or on top of the dashboard adjacent the lower edge of the windshield.

Also secured to the rear of the central panel 12 adjacent the lower edge thereof is a motor 21. The motor has a shaft 22 extending outwardly from one end thereof toward the upper edge of the mirror. Shaft 22 extends through a speed reduction gear box 24 that is secured to the rear of the center panel 12 above motor 21. A spur pinion 25 is fixed to the shaft 22. Pinion 25 meshes with a gear 27 which is rotatably mounted on a shaft 28 which is journaled in gear box 24 for rotation about an axis extending parallel to the axis of rotation of shaft 22. Fixed to one face of gear 27 to rotate therewith about shaft 28 is a pinion 29 that meshes with a gear 31 rotatably mounted on the shaft 22. Fixed to one face of gear 31 to rotate therewith is a pinion 32 which meshes with a gear 33 which is secured to shaft 28 to rotate the latter at a speed substantially less than that of the motor shaft.

Figure 2:
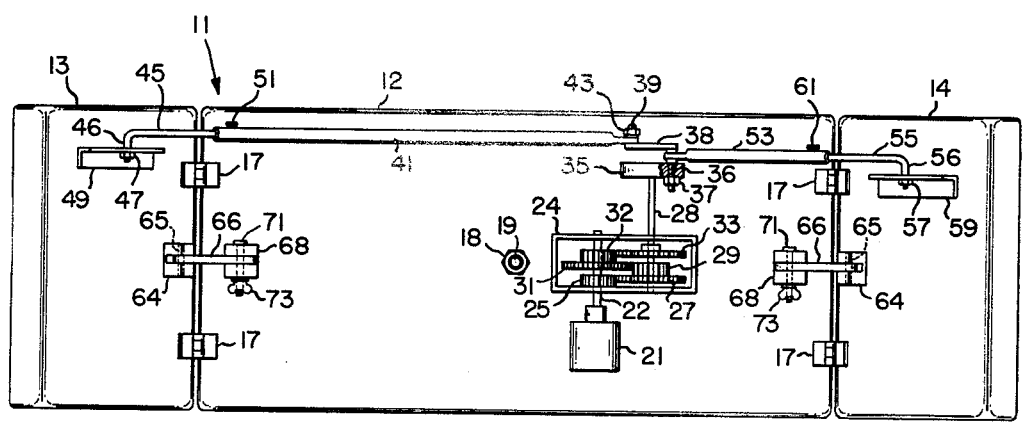
FIG. 2 is a rear elevational view of the mirror illustrated in FIG. 1.

As shown in FIG. 2, shaft 28 extends out of the top of the gear box 24 and has a circular disc or crank plate 35 secured centrally to its upper end. A pin 36 is secured at one end by a nut 37 in disc 35 and is secured to a connecting rod 38. Rod 38 is secured by a pin 39 and nut 43 to a telescoping lever comprising a sleeve or tube 41 and a rod 45. The free end of rod 45 is bent downwardly as at 46 and held by a nut 47 in one of four spaced holes 48 formed in a bracket 49 that is secured to the back of the side panel 13. A set-screw 51 threaded into sleeve 41 engages and locks rod 45 in adjusted position in the bore of the sleeve.

To drive the panel 14, a telescoping lever comprising sleeve or tube 53 and a rod 55 is provided. Rod 55 is bent downwardly at its free end as at 56 and is held by a nut 57 in one of four spaced holes 58 formed in a bracket 59 secured to the rear of panel 14. A set screw 61 threaded into sleeve 53 engages and locks rod 55 in adjusted position against axial, sliding movement in the bore of the sleeve.

A pivot pin 65 is carried by each of the mirror panels 13 and 14 between ears of a bracket 64. A locking lever 66 is pivotally mounted at one of its ends on each pin 65, and at its opposite end has a longitudinally extending slot 67 therethrough. The slotted end of each lever 66 is secured by a bolt 71 to slide between the ears of a bracket 68 that is secured to the rear face of the main mirror panel 12. A wing nut 73 threaded on each bolt 71 serves to hold the rod 66 in adjusted position.

When it is desired to oscillate both panels 13 and 14, rods 45 and 55 are adjusted in tubes 41 and 53 to achieve the desired throw or angular movement of mirror panels 13 and 14, and then the rods are locked in adjusted position by tightening screws 51 and 61. Also, wing nuts 73 are backed off from their respective bolts 71 sufficiently to permit the slotted ends of locking levers 66 to slide freely between the bifurcations on the brackets 68 to the extent permitted by the slots 67. A swich (not shown) controlling motor 21 is then thrown to "on" position so that the crank 35 is rotated. Pins 36 and 39 thus impart reciprocatory motion to the respective tubes 53 and 41 to impart oscillatory motion to the panels 13 and 14.

The extent of the angular displacement of a respective panel 13 or 14 about its hinge axis may be varied by inserting the respective bent end 46 or 56 of the associated rod into a different one of the four holes 48 and 58, respectively. For instance, when the end 46 of rod 45 is mounted in the hole 48 which is closest to the hinge axis of panel 13, the angular displacement of panel 13 during its oscillation will be greatest, while the positioning of the end 46 in the hole 48 which is furthest from the hinge axis of panel 13 will reduce the angular displacement of panel 13 to a minimum. The movement of panels 13 and 14 may be halted at any desired time merely by throwing the aforementioned switch to its "off" position.

Since it may be desirable to oscillate one of the panels 13 or 14 while maintaining the other in a stationary position, the drive to either panel 13 or 14 may be interrupted by loosening its associated screw 51 or 61, and tightening its associated wing nut 73.

From the foregoing it will be noted that applicant's novel mirror provides a relatively simple and easily operable means of affording the operator of an automobile an adjustable, panoramic view to the rear and sides of the automobile. Moreover, unlike prior oscilllating mirrors in which the entire mirror was adapted to be oscillated, thereby tending to upset and distract the automobile operator, and to interfere with his vision to the rear of the automobile during the oscillation of the mirror, the center or middle panel of applicant's mirror remains stationary at all times, even during the oscillation of the side panels. Applicant's invention thus affords an automobile operator both a variable and a constant view of the sides and rear of the automobile. Moreover, the drive to either of applicant's oscillating mirror panels may be readily interrupted, and the respective panel locked in a stationary, adjusted position; or with minor adjustment the extent of the angular oscillation of either panel 13 or 14 may be varied within the limits afforded by the openings 48 and 58 in the respective brackets 49 and 59, respectively. While brackets 49 and 59 have been described as having only four adjustment openings in each, it is to be understood that the number of openings in a respective bracket 49 or 59 may be varied as desired.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the limits of the appended claims.

Having thus described my invention, what I claim is:

1. A rear vision mirror for automobiles or the like comprising
   (a) a central mirror panel adapted to be mounted in a stationary position on an automobile,
   (b) two further mirror panels hinged, respectively, to opposite ends, respectively, of said central panel to pivot relative to said central panel about parallel hinge axes,
   (c) a member mounted on the rear of said central panel to rotate about an axis extending parallel to said hinge axes,
   (d) first and second pivot pins extending parallel to and radially spaced from the axis of rotation of said member and carried by said member for rotation thereby about its axis of rotation,
   (e) first and second means connecting, respectively, one of said pins to one of said further panels, and the other of said pins to the other of said further panels, and
   (f) a motor mounted on the rear of said central panel and connected to said member to rotate said member and the pins carried thereby,
   (g) said pins upon the rotation thereof being operative through said connecting means to impart oscillatory movement to said further panels relative to said central panel,
   (h) said first and second connecting means being adjustable independently of one another to control the extent to which said further panels oscillate, and each of said connecting means comprising,
   (i) a bracket secured to the rear of one of said further panels,
   (j) said bracket having a plurality of holes therethrough the centerlines of which extend parallel to and are radially spaced different distances from the adjacent hinge axis,
   (k) a first lever pivotally connected at one end to one of said pins,
   (l) a second lever pivotally and removably engaged at one end in one of said holes in said bracket, and engageable in another of said holes to adjust the extent of the oscillation of said one further panel, and
   (m) releasable locking means interposed between the opposite ends of said levers,
   (n) said locking means being movable to locking position to fix said opposite lever ends relative to one another during oscillation of said one further panel, and movable to a released position to permit relative movement between said opposite ends thereby to interrupt the oscillation of the last-named panel, and
   (o) first and second means for individually fixing each of said further panels, respectively, against movement relative to the central panel, when the corresponding releasable locking means is in released position.

2. A rear vision mirror for automobiles or the like comprising
   (a) a central mirror panel adapted to be mounted in a stationary position on an automobile,
   (b) two further mirror panels hinged, respectively, to opposite ends, respectively, of said central panel to pivot relative to said central panel about parallel hinge axes,
   (c) a member mounted on the rear of said central panel to rotate about an axis extending parallel to said hinge axes,
   (d) first and second pivot pins extending parallel to and radially spaced from the axis of rotation of said member and carried by said member for rotation thereby about its axis of rotation,
   (e) first and second means connecting, respectively, one of said pins to one of said further panels, and the other of said pins to the other of said further panels, and
   (f) a motor mounted on the rear of said central panel and connected to said member to rotate said member and the pins carried thereby,
   (g) said pins upon the rotation thereof being operative through said connecting means to impart oscillatory movement to said further panels relative to said central panel,
   (h) said first and second connecting means being adjustable independently of one another to control the extent to which said further panels oscillate, each of said connecting means comprising
   (i) a bracket secured to the rear of one of said further panels,
   (j) said bracket having a plurality of holes therethrough the centerlines of which extend parallel to and are radially spaced different distances from the adjacent hinge axis,
   (k) a first lever pivotally connected at one end to one of said pins,
   (l) a second lever pivotally and removably engaged at one end in one of said holes in said bracket, and engageable in another of said holes to adjust the extent of the oscillation of said one further panel, and
   (m) releasable locking means interposed between the opposite ends of said levers,
   (n) said locking means being movable to locking position to fix said opposite lever ends relative to one another during oscillation of said one further panel, and movable to a released position to permit relative movement between said opposite ends thereby to interrupt the oscillation of the last-named panel,
   (o) two further levers mounted adjacent opposite ends of said central panel and movable relative thereto during oscillation of said further panels, and (p) means connecting each of said further levers at opposite ends thereof, respectively, to said central panel and to the adjacent one of said further panels, respectively, (q) the last-named means including manually operable means for individually fixing each of said further levers relative to said central panel when a corresponding locking means is moved to its released position thereby to fix the corresponding further panel relative to said central panel.

3. A rear vision mirror for automobiles or the like comprising (a) a central mirror panel, (b) a pair of side mirror panels hingedly connected to the central panel at opposite ends thereof, (c) a rotary crank mounted for rotation about an axis parallel to the hinge axes of said side panels and having an eccentric crank-pin, (d) a telescopic connecting rod pivotally connected at one end to said crank-pin for pivotal movement about an axis parallel to the crank axis and pivotally connected at its opposite end with one of said side panels, (e) a link fixed at one end to said crank pin to rotate therewith about said crank axis, (f) a second telescopic connecting rod pivotally connected at one end to the opposite end of said link for pivotal movement about an axis parallel to said crank axis, and pivotally connected at its opposite end to the other of said side panels, (g) releasable locking means on each of said connecting rods selectively movable to an operative position to prevent the telescoping of its corresponding connecting rod, and to cause the corresponding side panel to be oscillated about its hinge axis upon the rotation of said crank, (h) further locking means interposed between said central panel and at least one of said side panels, (i) said further locking means being movable to an operative position to fix the last-named side panel relative to said central panel when the first-named locking means is in its inoperative position, and (j) a bracket secured to each of said side panels, (k) each of said brackets having a plurality of holes therethrough the centerlines of which are parallel to and radially spaced different distances, respectively, from the adjacent hinge axis, and (l) each of said connecting rods having said opposite end thereof removably pivoted in one of said holes.

References Cited in the file of this patent

UNITED STATES PATENTS

| | | |
|---|---|---|
| 434,235 | Barney | Aug. 12, 1890 |
| 1,892,860 | Wehr et al. | Jan. 3, 1933 |
| 2,241,866 | Needham | May 13, 1941 |
| 2,467,266 | Lumsden | Apr. 12, 1949 |
| 2,582,651 | Peterson | Jan. 15, 1952 |
| 2,802,394 | Krone | Aug. 13, 1957 |
| 2,818,778 | Falciglia | Jan. 7, 1958 |
| 2,861,457 | Harrison | Nov. 25, 1958 |
| 2,979,989 | Calder | Apr. 18, 1961 |
| 3,021,756 | Milton et al. | Feb. 20, 1962 |
| 3,063,342 | Zeek | Nov. 13, 1962 |

FOREIGN PATENTS

| | | |
|---|---|---|
| 554,901 | Germany | Jan. 7, 1931 |